3,055,852
POLYTETRAFLUOROETHYLENE - CELLULOSIC ETHER DISPERSION, METHOD OF FORMING COATINGS THEREWITH, AND ARTICLE COATED THEREWITH
Earl L. Youse, Berkeley Heights, N.J., assignor to Acheson Industries, Inc., Port Huron, Mich., a corporation of Michigan
No Drawing. Filed Sept. 8, 1958, Ser. No. 759,390
12 Claims. (Cl. 260—17)

This invention relates to polytetrafluoroethylene dispersions which are suitable for the formation of protective and dry film lubricant coatings on various substrate surfaces, to the method of forming such coatings and the articles produced thereby. More particularly this invention relates to an improved polytetrafluoroethylene dispersion which is capable of being applied to substrate surfaces and of forming an adherent film thereon having uniformly distributed polytetrafluoroethylene particles therein without the application of heat to cure the coating.

The primary object of this invention is to provide a dispersion of finely divided polytetrafluoroethylene particles which is improved in the respect that it can be applied to a substrate surface and dried thereon at ordinary atmospheric ambient, or room, temperatures.

A further object of this invention is to provide a method of forming protective and dry film lubricant coatings on a variety of substrate surfaces which contain uniformly distributed polytetrafluoroethylene particles as a discontinuous phase in a continuous phase film of the air drying type.

In accordance with this invention it has been found that the above and related objects can be realized by forming a relatively dilute dispersion comprising finely divided polytetrafluoroethylene particles and a cellulose ether and applying that dispersion to the selected substrate surface. The cellulose ether is present in sufficient quantity to act as the continuous phase for securing the polytetrafluoroethylene particles to a substrate surface and the polytetrafluoroethylene particles constitute a uniformly distributed discontinuous phase therein. By the expression "relatively dilute dispersion" is meant that the total quantity of polytetrafluoroethylene and cellulose ether resin solids is restricted to a relatively minor quantity and for best results is maintained at less than about 40% by weight of the dispersion. It has been found that these dispersions when applied to substrate surfaces by brushing, dipping or spraying, produce adherent films in which the polytetrafluoroethylene particles are uniformly distributed by merely applying the dispersion to the surface and allowing it to dry at ambient temperatures. The substrates may include metals, rubber, leather, glass, plastics, wood, cork, etc. and when so applied to said surfaces the resultant film is characterized by lubricating, parting and corrosion resistance properties comparable to those which characterize a fused solid film of polytetrafluoroethylene of comparable thickness.

The dispersions of this invention may be formed with a variety of dispersing media including water, organic solvents capable of dissolving cellulosic ethers and compatible with modifying resins, or mixtures of water and such solvents, and the preferred dispersing medium is an admixture of water and organic solvents for the cellulose ether.

Polytetrafluoroethylene particles which are suitable for use in the dispersions of this invention are those which have been condensed or pluralized to an extent such that they are normally solid and are dispersible in a liquid medium of water or an organic suspending agent such as hydrocarbons, alcohols, esters, ketones, etc., and which have a particle size of about 0.1 to about 3 microns, the predominant portion having a size of about 1 micron. It is preferred to employ an aqueous suspension of colloidal polytetrafluoroethylene as the source of the polytetrafluoroethylene particles. Suitable starting materials of this type include an aqueous suspension containing 60% polytetrafluoroethylene particles having a size in the range of about 0.1 to about 3 microns, available under the trade name Teflon 30, and an aqueous suspension containing about 40% polytetrafluoroethylene particles of comparable size and available under the trade name Teflon 41–X.

The cellulose ethers which serve as the continuous phase-producing ingredient of the dispersions of this invention are all of the cellulose ethers which form films in air at ambient temperatures, including, for example, methyl cellulose, ethyl cellulose, ethyl hydroxyethyl cellulose, carboxy methyl cellulose, carboxy ethyl cellulose, hydroxypropyl methyl cellulose, etc. Mixtures of such cellulose ethers can be used if desired, and mixtures are desirable in certain instances to obtain particular properties in the continuous phase portion of the coating. The dispersing medium may be only water for dispersions employing methyl cellulose, carboxy methyl cellulose and hydroxyethyl cellulose as the cellulose ether ingredient, or may be an organic solvent of common type that is well known to those skilled in this art to be a satisfactory solvent for the particular cellulose ether which has been selected. Typical examples of suitable solvents include the alcohols, such as, ethanol, propanol, butanol, etc., esters such as ethyl acetate and butyl acetate, hydrocarbons such as benzene, toluene, xylene and heptane, and ketones such as acetone. It is also suitable to use chlorinated hydrocarbons such as ethylene dichloride, methylene chloride and carbon tetrachloride.

The dispersions are formed by preliminarily dissolving the cellulose ether and modifying resins and dispersing agents which may be optionally included in the solvent selected for the cellulose ether and thereafter blending in the polytetrafluoroethylene particles, as finely divided powder or in the form of an aqueous dispersion as above described. As above indicated the sum of the polytetrafluoroethylene solids and the cellulose ether solids should not exceed about 40% by weight of the dispersion and the preferred dispersions contain between about 10% and about 25% total solids. Of this total solids, the polytetrafluoroethylene particles may satisfactorily constitute between about 20% and about 80% by weight. When the polytetrafluoroethylene particles comprise less than about 20% by weight of the combined cellulose ether and polytetrafluoroethylene solids, the characteristics of the applied coatings are somewhat inferior from the standpoint of lubricity and particularly the wear life of the coating. When the proportion of polytetrafluoroethylene particles is in excess of about 80% by weight of the sum of the polytetrafluoroethylene and cellulose ether solids it is difficult to maintain uniform distribution of the particles applied to the surface and to preserve the necessary adherence for those particles. It is preferred that the dispersions contain proportions of polytetrafluoroethylene between about 40% and about 60% by weight of the combined cellulose ether and polytetrafluoroethylene solids. From the standpoint of ease in application of the dispersions, the cellulose ether concentration is preferably maintained below about 24% by weight of the dispersion, and as the cellulose ether approaches this preferred maximum quantity, the proportion of polytetrafluoroethylene solids must be adjusted to constitute the balance when the total solids exceeds 30% and approaches the maximum of 40%.

The dispersions thus formed are sufficiently stable to enable their use and application to substrate surfaces in accordance with practical and commercial application methods. It has been found, however, that the stability of the dispersion is improved by the incorporation therein of a relatively small quantity of polyvinyl butyraldehyde. For this purpose about 5% to about 15% by weight of polyvinyl butyraldehyde, based on the weight of the cellulose ether solids, is satisfactory. Although it is unnecessary for utility, the dispersions may also include a compatible wetting agent to aid in the spreading of the dispersion on the substrate surface as it is applied. Where the selected cellulose ether is methyl cellulose it is preferred that the dispersion contain a wetting agent, and illustrative suitable wetting agents for this purpose include sodium dioctyl sulfosuccinate such as Aerosol OT, and alkyl phenyl polyethylene glycol ethers such as Tergitol NPX. As above indicated, these or similar types of wetting agents may optionally be present when the cellulose ether is other than methyl cellulose. In any case the proportion of wetting agent which is suitable for use is in the range of about .1 to about 2% by weight of the dispersion.

The dispersions of this invention may be applied to the substrate to be coated by brushing, dipping or spraying. When the total solids in the dispersion exceeds about 15% the preferred method of application is brushing. The materials which can be satisfactorily coated include metal, glass, wood, leather, rubber, cork and the like. The adhesion of the coating is enhanced, in general, by preliminarily roughening the surface such as by mechanical abrasion or by grit blasting, and where the substrate is metal a preferred method is the use of conventional surface conditioning treatments to prepare the metal to receive a siccative coating such as metallic phosphate treatments, acid etching, oxidizing and the like. The coatings are applied in relatively thin layers and even where a relatively thick total coating is desired the coating is preferably built up by applying successive thin layers. By this procedure, coatings having a thickness as high as about 1.5 mils can be easily prepared and the benefits of this invention of improved lubricity, corrosion resistance and non-wettability are obtained when the coatings have a thickness in the range of about 0.1 to about 1.5 mils. For most purposes a coating having a thickness in the range of about 0.3 to about 0.8 mil is satisfactory, and preferred to the relatively thicker coatings which in some applications have a greater tendency to flake and spall during use.

It is apparent that the presence of a film-forming carrier for the polytetrafluoroethylene particles which is capable of drying, at ambient temperatures, avoids many of the disadvantages which previously characterized the attempts to position adherent polytetrafluoroethylene on the surface of other materials. The dispersions of this invention make it feasible to apply polytetrafluoroethylene to substrate materials incapable of withstanding the heating required to fuse polytetrafluoroethylene or to cure other resin films which serve to secure such particles to a surface. The coatings which result from the use of the dispersions of this invention, as above described, are characterized by coefficients of friction approaching those that are characteristic of coatings which result from the heat-fusing of polytetrafluoroethylene.

The dispersions and the method of this invention are illustrated in greater detail in the specific typical and illustrative examples which follow.

*Example I*

A dispersion was prepared by first dissolving 13.8 parts of ethyl cellulose having a 47.5%–49% ethoxyl content and a viscosity of 22 cps. at 5% concentration by weight at 25° C. in 80:20 toluene:ethanol, in 198.6 parts commercial ethyl alcohol, 13.8 parts ethylene glycol monoethyl ether, 13.8 parts n-butanol and 13.8 parts hexylene glycol. Into this solution was then blended 77.1 parts of an aqueous polytetrafluoroethylene suspension, Teflon 30, containing 60% polytetrafluoroethylene solids by weight.

The resulting product exhibited good compatibility and was placed in a De Vilbiss spray gun, model MBC with a No. 30 tip, and was sprayed on a plurality of 4″ x 6″ clean low carbon steel panels by using an air pressure of between 25 and 50 pounds/sq. inch, the nozzle being between 12 inches and 30 inches from the panels. The resulting coatings had thicknesses in the range of about 0.2 mil to about 0.4 mil and were observed to be adherent coatings in which the polytetrafluoroethylene particles were relatively uniformly distributed over the surface. The panels were tested for coefficient of static friction and found to have an average coefficient of 0.07. The panels were also tested for adhesion by bending the same around a ¼ inch mandrel, and adhesion was found to be satisfactory.

*Example II*

A dispersion was prepared by preliminarily dissolving 9.2 parts of ethyl cellulose having an ethoxyl content of 47.5% to 49% and a viscosity of 22 cps. determined as in Example I, in 9.2 parts of ethylene glycol monoethyl ether, 9.2 parts n-butanol and 132.4 parts of commercial ethyl alcohol with shaking. Into this solution was blended with stirring, 50 parts of Teflon 30. The resulting dispersion was then applied to a plurality of 4″ x 6″ low carbon steel panels by spraying, as in Example I, and the resulting coatings were observed to be adherent and slightly rough in character. Another set of coatings were formed by brushing the same solution on the surface of a plurality of comparable panels and the resulting coating was observed to be more uniform in texture than the sprayed coatings.

*Example III*

A dispersion was formed by dissolving 5 parts of ethyl hydroxyethyl cellulose in 95 parts of toluene. The ethyl hydroxyethyl cellulose has a viscosity of 211 cps. determined as in Example I, and a hydroxyethyl content of 0.3 to 0.4% and an ethoxyl content of about 2.53%. 8.3 parts of Teflon 30 was then slowly blended into the solution of ethyl hydroxyethyl cellulose and the resulting dispersion was sprayed, in the same equipment and under the same conditions specified above in Example I, on clean steel 6″ x 4″ steel panels, using 6 passes. The resulting coating was allowed to dry in air and was tested and found to have a static coefficient of friction of 0.08. The coating was observed to have good adhesion and to contain uniformly distributed polytetrafluoroethylene particles therein.

*Example IV*

An aqueous dispersion was prepared by dissolving 8 parts of methyl cellulose in 392 parts of water in the presence of 0.1 part of sodium dioctyl sulfosuccinate by rapidly stirring the same at room temperature. 13.3 parts of Teflon 30 was then blended into the methyl cellulose solution, with stirring, and the resulting solution had the appearance of a uniform dispersion. This dispersion was then sprayed on the surface of phosphate coated steel 4″ x 6″ panels, in the equipment and under the conditions specified above in Example I, by using 4 passes across the surface. The resulting coating was allowed to dry and upon inspection was observed to be adherent and to have spaced groups of polytetrafluoroethylene particles relatively uniformly distributed, and the coating had satisfactory adherence to the surface. The coating was tested and found to have a coefficient of static friction of 0.07.

The dispersions as formulated in Examples I through IV were applied by spraying, under comparable conditions, to the surfaces of wood, cork, rubber, natural and synthetic, glass and the surfaces of various plastics including thermoset phenol formaldehyde, thermoset urea formaldehyde, polyamides, polyesters, vinyls, acrylics and polyethylenes, and in each case the coating cured at ambient temperature to an adherent film.

Example V

A dispersion was made by preliminarily dissolving 10.7 parts of ethyl cellulose, having an ethoxyl content of 47.5% to 49% and a viscosity of 10 cps., as determined on a sample having 5% concentration in 80:20 toluene:ethanol at 25° C., and 1.1 parts of polyvinyl butyraldehyde in 20 parts toluene and 50.2 parts of commercial ethanol. 18 parts of Teflon 30 was slowly blended into the ethyl cellulose solution by stirring and after spray application to a plurality of panels, of comparable type and under comparable conditions to those described above in Example I, the resulting coatings were observed to be adherent, relatively smooth and to contain uniformly distributed polytetrafluoroethylene particles therein.

Example VI

A dispersion was made by preliminarily dissolving 2.5 parts ethyl hydroxyethyl cellulose and 2.5 parts of ethyl cellulose in 95 parts toluene. 8.3 parts of Teflon 30 was then blended into the solution of ethyl hydroxyethyl cellulose and ethyl cellulose, by stirring, and a plurality of 4" x 6" metal panels were sprayed with the resulting dispersion, in the apparatus and in accordance with the procedure set forth above in Example I. The resulting coatings were observed to be adherent, smooth and to contain uniformly distributed polytetrafluoroethylene particles therein. The coefficient of static friction was measured and found to be 0.096.

What is claimed is:

1. A polytetrafluoroethylene dispersion comprising polytetrafluoroethylene particles having a size in the range of about 0.1 micron to about 3 microns, a cellulose ether resin and a dispersive medium capable of dissolving said resin, about 5% to about 15% by weight of polyvinylbutyraldehyde, based on the weight of the said cellulose ether resin solids, said dispersion containing less than about 40% combined polytetrafluoroethylene and resin solids, by weight of said dispersion, and said polytetrafluoroethylene particles constituting between about 20% and about 80% of the combined cellulose ether resin and polytetrafluoroethylene.

2. A dispersion in accordance with claim 1 wherein the combined polytetrafluoroethylene and resin solids is in the range of 10% to about 25% and there is present in said dispersion between about 0.1 and about 2% of a compatible wetting agent.

3. A method of forming a polytetrafluoroethylene containing coating on a substrate which comprises the steps of applying to the surface thereof a dispersion containing polytetrafluoroethylene particles having a size in the range of about 0.1 micron to about 3 microns, at least one cellulose ether resin, a dispersing medium capable of dissolving said cellulose ether resin, 5% to 15% polyvinylbutyraldehyde based on the weight of said cellulose ether resin solids, said dispersion containing less than about 40% combined polytetrafluoroethylene and resin solids, by weight of said dispersion, and drying said dispersion at ambient temperatures until the said polytetrafluoroethylene particles constitute a substantially uniformly distributed discontinuous phase in a continuous phase of the said cellulose ether resin.

4. A method of forming an adherent, low-friction polytetrafluoroethylene-containing coating on a substrate which comprises the steps of applying to the surface thereof a composition comprising an aqueous dispersion of polytetrafluoroethylene particles having a size in the range of about 0.1 micron to about 3 microns in intimate admixture with at least one cellulose ether resin dissolved in a solvent therefor, said composition containing between about 10% and about 25% combined polytetrafluoroethylene and resin solids by weight of said composition, said polytetrafluoroethylene particles constituting between about 20% and about 80% of the combined cellulose ether resin and polytetrafluoroethylene, and drying said composition at ambient temperatures until the said polytetrafluoroethylene particles constitute a substantially uniformly distributed discontinuous phase in a continuous phase of the said cellulose ether resin.

5. A method of forming an adherent, low-friction polytetrafluoroethylene-containing coating on a substrate which comprises the steps of applying to the surface thereof a composition consisting essentially of an aqueous dispersion of polytetrafluoroethylene particles having a size in the range of about 0.1 micron to about 3 microns in intimate admixture with at least one cellulose ether resin dissolved in a solvent therefor, said composition containing less than about 40% combined polytetrafluoroethylene and resin solids by weight of said composition, said polytetrafluoroethylene particles constituting between about 20% and about 80% of the combined cellulose ether resin and polytetrafluoroethylene, and drying said composition at ambient temperatures until the said polytetrafluoroethylene particles constitute a substantially uniformly distributed discontinuous phase in a continuous phase of the said cellulose ether resin.

6. A method in accordance with claim 5 wherein said cellulose ether resin is ethyl cellulose.

7. A method in accordance with claim 5 wherein said cellulose ether resin is methyl cellulose.

8. A method in accordance with claim 5 wherein said cellulose ether resin is ethyl hydroxyethyl cellulose.

9. A method in accordance with claim 5 wherein said cellulose ether resin is carboxymethyl cellulose.

10. A method in accordance with claim 5 wherein said cellulose ether resin is hydroxypropyl methyl cellulose.

11. An article having on its surface an adherent low-friction protective coating comprising a dried cellulose ether resin having distributed therein polytetrafluoroethylene particles having a size in the range of about 0.1 micron to about 3 microns as a discontinuous phase, said coating having a thickness in the range of about 0.1 to about 1.5 mils, said polytetrafluoroethylene particles constituting between about 20% and about 80% of the combined cellulose ether resin and polytetrafluoroethylene.

12. An article as claimed in claim 11 wherein said coating has a thickness in the range of about 0.3 to 0.8 mil.

References Cited in the file of this patent

UNITED STATES PATENTS

| | | |
|---|---|---|
| 2,413,498 | Hill | Dec. 31, 1946 |
| 2,719,833 | Vincent et al. | Oct. 4, 1955 |
| 2,868,741 | Chambers | Jan. 13, 1959 |
| 2,878,196 | Buffington | Mar. 17, 1959 |
| 2,881,142 | Elridge | Apr. 7, 1959 |
| 2,951,047 | Lantos | Aug. 30, 1960 |